United States Patent
Kang et al.

(10) Patent No.: US 8,238,805 B2
(45) Date of Patent: Aug. 7, 2012

(54) IMAGE FORMING APPARATUS AND AUTO COLOR REGISTRATION METHOD THEREOF

(75) Inventors: Kyung Pyo Kang, Suwon-si (KR); Hae Seog Jo, Yongin-si (KR); Yong Ho You, Suwon-si (KR); Jin Ju Park, Suwon-si (KR); Sang Woon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 12/685,043

(22) Filed: Jan. 11, 2010

(65) Prior Publication Data

US 2010/0178084 A1    Jul. 15, 2010

(30) Foreign Application Priority Data

Jan. 12, 2009  (KR) .................................. 2009-2311

(51) Int. Cl.
*G03G 15/01*    (2006.01)

(52) U.S. Cl. ......................................... 399/301; 399/49
(58) Field of Classification Search .................... 399/49, 399/301
See application file for complete search history.

(56) References Cited

FOREIGN PATENT DOCUMENTS

JP         2007-249081           9/2007

*Primary Examiner* — Hoang Ngo
(74) *Attorney, Agent, or Firm* — Stanzione & Kim, LLP (57) ABSTRACT

An image forming apparatus and an auto color registration method thereof. The image forming apparatus performs an auto color registration (ACR) operation by excluding or minimizing the influence caused by variation in speed of a drive unit driving a transfer member. The image forming apparatus includes a controller, which prints a test pattern of each color according to a rotation period of the drive unit, and controls an operation for outputting an image in which each color registration error is corrected on the basis of the test pattern, such that a reliability of the ACR operation is increased and a quality of an image output from the image forming apparatus is also increased.

19 Claims, 8 Drawing Sheets

IMAGE FORMING APPARATUS AND AUTO COLOR REGISTRATION METHOD THEREOF

CROSS-REFERENCE TO RELATED APPLICATIONS

This application claims priority under 35 U.S.C. §119(a) of Korean Patent Application No. 2009-0002311, filed on Jan. 12, 2009 in the Korean Intellectual Property Office, the disclosure of which is incorporated herein by reference.

BACKGROUND

1. Field of the Invention

Embodiments of the present general inventive concept relate to an image forming apparatus and an auto color registration method thereof, which perform an auto color registration operation by excluding or minimizing the influence caused by variation in speed of a drive roller driving a transfer member.

2. Description of the Related Art

Generally, an image forming apparatus has been widely used to print an image on a printing medium such as paper according to an input image signal. There are a variety of image forming apparatuses, for example, a printer, a copier, a facsimile, and a combination thereof such as a multi-functional printer.

For example, an electrophotographic-type color-image forming apparatus may be a tandem-type image forming apparatus. The tandem-type image forming apparatus includes as many photo-conductors as the number of colors used for printing and as many developing machines as the number of colors used for printing.

Generally, the color image forming apparatus uses toners of four colors (Yellow, Magenta, Cyan, Black), such that the tandem-type image forming apparatus includes four photo-conductors corresponding to individual colors and four developing machines corresponding to the individual colors. This image forming apparatus is able to print data at high speeds, but it performs the color printing by overlapping images of the individual colors on individual photo-conductors, such that a defective image caused by a color registration error may easily be generated.

Accordingly, the color image forming apparatus performs an auto-color registration (ACR) operation to accurately arrange individual colors at desired positions of the paper.

The ACR operation may be used to correct a relative position where four colors are formed in such a manner that images of four colors are correctly arranged on the paper. Typically, according to the ACR operation, test patterns of respective colors are sequentially printed on the printing medium one by one, and the interval between test patterns of respective colors is detected, such that distortion, i.e., a color registration error, may be corrected according to the detected result. By the above ACR process, image quality may be increased.

However, the conventional image forming apparatus has performed the ACR process without considering a mechanical variation factor caused by the drive roller. Although the variation in speed occurs according to the shape of the drive roller which drives the transfer member to transfer the printing medium onto which the test pattern is printed, the conventional image forming apparatus does not prepare for color image distortion caused by the variation in speed of the drive unit, such that precision of the ACR operation is unavoidably decreased, resulting in a deterioration of image quality.

SUMMARY

The present general inventive concept provides an image forming apparatus, which accurately corrects each color registration error by excluding or minimizing the influence caused by variation in speed of a drive unit such that it increases image quality, and an auto-color registration method for use in the image forming apparatus.

Additional aspects and utilities of the general inventive concept will be set forth in part in the description which follows and, in part, will be obvious from the description, or may be learned by practice of the general inventive concept The foregoing and/or other features and utilities of the present general inventive concept may be achieved by providing an image forming apparatus including a transfer member, a drive unit to drive the transfer member, and a controller to print a test pattern of each color according to a rotation period of the drive unit, and control an operation to output an image in which each color registration error is corrected on the basis of the test pattern.

The test pattern of each color may be printed on the transfer member or a printing medium.

The drive unit may include a drive roller having a circular cross section.

The apparatus may further include a sensor to detect the test pattern, and a color registration correction unit to calculate a correction value by measuring a distance between a test pattern of a reference color and another test pattern of a correction-target color, where the reference color's test pattern and the correction-target color test pattern are detected by the sensor, wherein the test pattern of the reference color and the test pattern of the correction-target color are printed according to the same rotation phase with respect to the drive unit.

The color registration correction unit may average measurement values of a plurality of test patterns of respective colors belonging to one rotation period of the drive unit.

The color registration correction unit may calculate a first correction value to correct each color registration error in a paper-transferring direction, and a second correction value to correct each color registration error in a main-scanning direction.

The apparatus may further include a storage unit to store the first correction value, the second correction value, and information of the test patterns of the respective colors.

The foregoing and/or other aspects and utilities of the present general inventive concept may also be achieved by providing a color registration method for an image forming apparatus, the method including printing test patterns of respective colors according to a rotation period of a drive unit driving a transfer member, measuring a distance between a test pattern of a reference color and another test pattern of a correction-target color among the test patterns of the respective colors, and calculating a correction value to correct each color registration error on the basis of the measured distance.

The method may further include printing the test pattern of the reference color and the test pattern of the correction-target color according to the same rotation phase with respect to the drive unit.

The calculating of the correction value may include averaging measurement values of a plurality of test patterns of respective colors belonging to one rotation period of the drive unit.

The calculating of the correction value may include calculating a first correction value to correct each color registration error in a paper-transferring direction by detecting a basic-type test pattern, and calculating a second correction value to correct each color registration error in a main-scanning direction by detecting a mixed-type test pattern.

The foregoing and/or other features and utilities of the present general inventive concept may also be achieved by providing an image forming apparatus including a plurality of photo-conductors to print a test color print, a transfer medium, a transfer roller directing the transfer medium across the plurality of photo-conductors, the transfer roller having a non-circular shape and a regular period of rotation, a color registration unit to receive test color print information from the transfer medium, and a controller in communication with the plurality of photo-conductors to print the test color print onto the transfer medium at an interval related to the rotational period of the transfer roller and in communication with the color registration unit to receive the test color print information, the controller correcting each color registration error on the basis of the test color print.

The plurality of photo-conductors may print the colors yellow, cyan, magenta, and black.

The controller may calculate a first correction value to correct each color registration error in a paper-transferring direction, and a second correction value to correct each color registration error in a main-scanning direction.

The image forming apparatus may also include a storage unit to store the first correction value, the second correction value, and information of the test color prints of each color.

The foregoing and/or other features and utilities of the present general inventive concept may also be achieved by providing an image forming apparatus including a drive unit to move a transfer medium, the drive unit having a roller with a semi-circular cross-section, and a controller to print a test pattern of each color on the transfer medium according to a rotation period of the roller of the drive unit, and to control an operation for outputting an image in which each color registration error is corrected on the basis of the test pattern.

The colors in the test pattern may include the colors yellow, cyan, magenta, and black.

The controller may calculate a first correction value to correct each color registration error in a paper-transferring direction, and a second correction value to correct each color registration error in a main-scanning direction.

The image forming apparatus may also include a storage unit to store the first correction value, the second correction value, and information of the test patterns of each color.

The foregoing and/or other features and utilities of the present general inventive concept may also be achieved by providing an image forming apparatus including a transfer member to transfer an image on a print medium, a drive roller to drive the transfer member, the driver roller being a non-circular shape causing a non-linear speed of the transfer member, and a controller to generate a signal to control the drive roller to compensate for the non-linear speed of the transfer member The image forming apparatus may also include a drive source to drive the drive roller. The controller may output the signal to the drive source.

The controller may detect the non-circular shape of the drive roller to output the signal.

The controller may detect the non-linear speed of the drive roller to output the signal.

The controller may detect a pattern formed on the print media using the drive roller and the transfer member to determine at least one of the non-circular shape of the drive roller and the non-linear speed of the transfer member to generate the signal.

BRIEF DESCRIPTION OF THE DRAWINGS

These and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to various exemplary embodiments of the present general inventive concept, examples of which are illustrated in the accompanying drawings, wherein like reference numerals refer to like elements throughout. The embodiments are described below in order to explain the present general inventive concept by referring to the figures.

Figure 1:
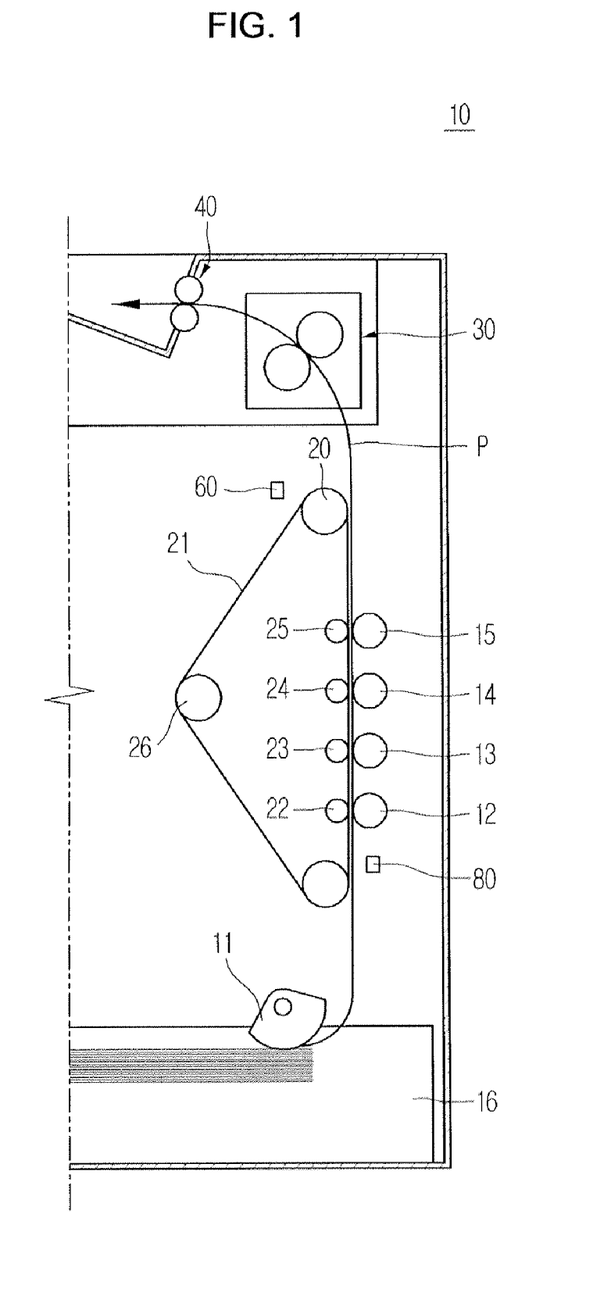
FIG. 1 is a structural diagram illustrating an image forming apparatus according to an exemplary embodiment of the present general inventive concept.

As illustrated in FIG. 1, an image forming apparatus 10 according to an exemplary embodiment includes photo-conductors 12, 13, 14, and 15 respectively corresponding to cyan (C), magenta (M), yellow (Y) and black (B) for color printing.

A pickup roller 11 picks up a printing medium, such as a sheet of paper, loaded in a paper-feeding unit 16, and feeds the sheet of paper to a space between a transfer member 21 and each photo-conductor 12, 13, 14, or 15. A feeding sensor 80 detects whether a sheet of paper is fed or not. A driver roller 20 for receiving power through a connection to a drive source drives the transfer member 21. The driver roller 20 is assisted by additional driver roller or support roller 26 in driving the transfer member 21. Therefore, the transfer member 21 moves in a cycle simultaneously while being brought into contact with the sheet of paper through each photo-conductor 12, 13, 14, or 15, and the fed sheet of paper moves along a transfer path P. In this case, color images respectively formed on the photo-conductors 12, 13, 14, and 15 are transferred onto the sheet of paper by respective transfer rollers 22, 23, 24, and 25, such that the respective color images overlap one another on the paper. If the sheet of paper onto which the image is transferred passes a fixing unit 30 for applying the high heat and pressure, this image is fixed to the sheet of paper, such that the resultant sheet of paper is discharged to the outside of the image forming apparatus 10 through a paper-discharging unit 40.

A color registration sensor 60 is arranged at one side of the transfer member 21. The color registration sensor 60 illuminates light on a test pattern of each color and receives the light reflected from the test pattern, such that it outputs a detection signal.

Figure 2:
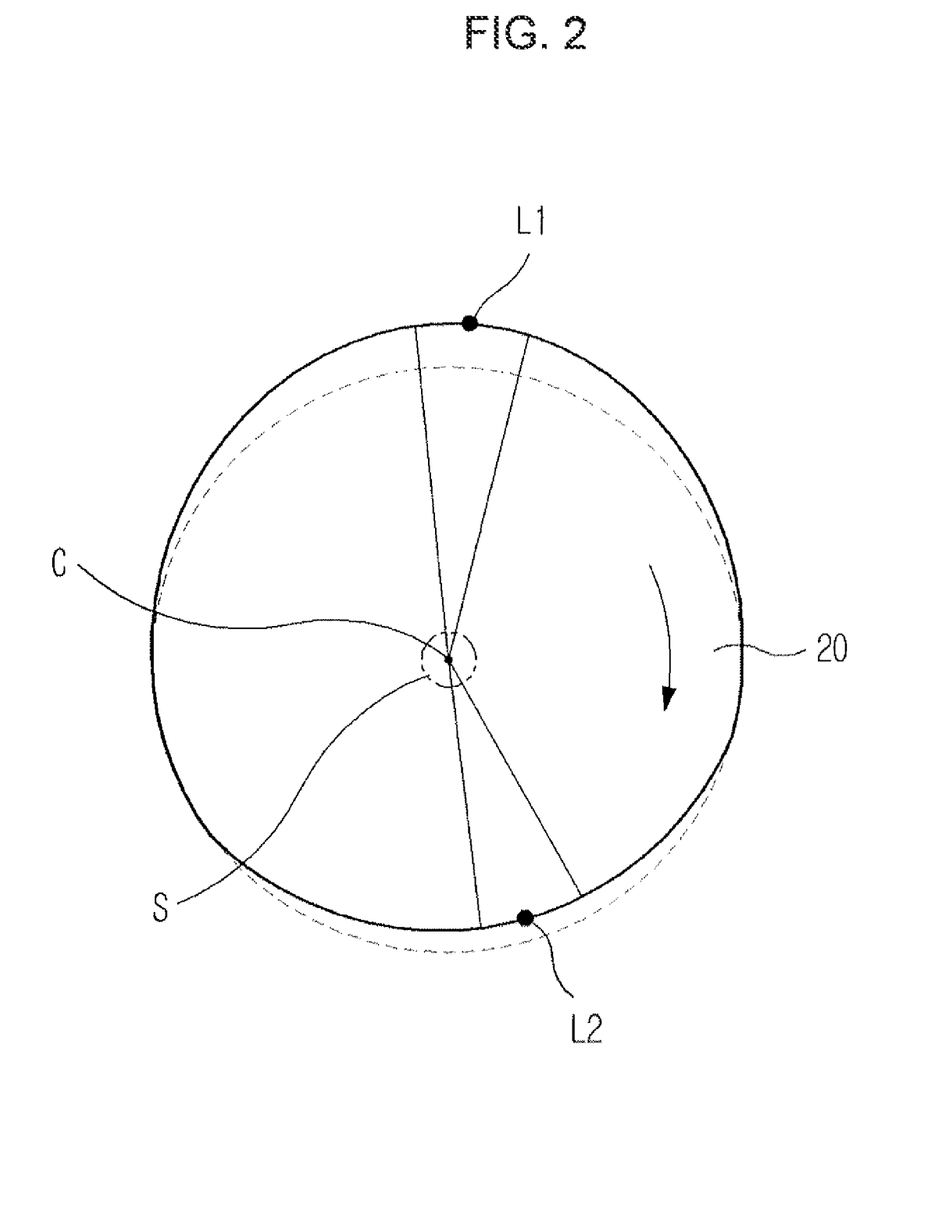
FIG. 2 illustrates the appearance of a drive roller of FIG. 1.
Figure 3:
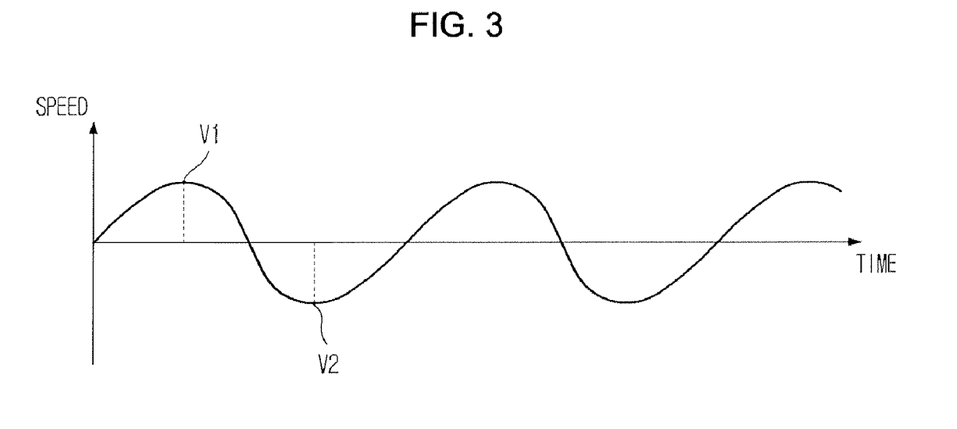
FIG. 3 is a graph illustrating a variation in speed of the drive roller of FIG. 1.

As illustrated in FIG. 2, the drive roller 20 is connected to a drive source S such as a motor (not shown) so that it is driven at a certain speed upon receiving a control signal from a controller. If the cross section of the drive roller 20 is not a perfect circle with respect to a rotation axis C, a linear velocity of the drive roller 20 is not constant but variable with a rotation period. As illustrated in FIG. 3, a linear velocity V1 measured at a protruded part L1 located outside of the drive roller 20 is relatively high, and a linear velocity V2 measured at a hollowed or reduced part L2 of the drive roller 20 is relatively low.

If the image forming apparatus corrects each color registration error by measuring an interval between test patterns of respective colors on the condition that a variation in speed is generated by the shape of the drive roller 20, it may not accurately correct each color registration error due to this variation in speed. In other words, since a position at which a first test pattern of a reference color is printed and another position at which a second test pattern of another color to be corrected may be affected by the speed variation of the drive roller, a drive-roller speed applied to the first test pattern may be different from that of the second test pattern, such that difficulty may arise in accurately correcting each color registration error.

If the speed variation unavoidably occurs in a drive unit such as the driver roller 20, e.g., if the cross-section of the driver roller 20 is not a perfect circle with respect to axis C, there is a need to correct each color registration error so that the variation in speed is excluded or minimized.

Figure 4:
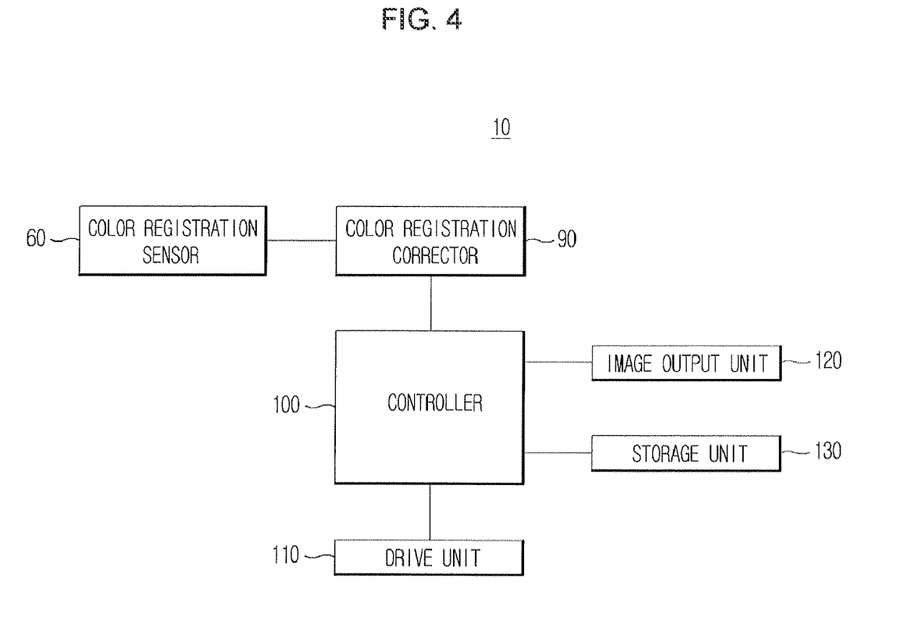
FIG. 4 is a control block diagram illustrating an image forming apparatus according to an exemplary embodiment of the present general inventive concept.

As illustrated in FIG. 4, the image forming apparatus 10 of FIG. 1 corrects each color registration error. In order to exclude or minimize the above color registration error caused by the speed variation of the drive roller 20, the image forming apparatus 10 includes a color registration sensor 60, a color registration corrector 90, a controller 100, a drive unit 110, an image output unit 120, and a storage unit 130.

The color registration sensor 60 detects the test pattern printed on the transfer member 21, and outputs the detected signal, such that it performs a color registration operation. This embodiment has exemplarily disclosed that the test pattern for correcting each color registration error is printed on the transfer member 21, and a paper transfer belt (PTB) may be exemplarily used as this transfer member. However, the scope of the transfer member is not limited to only the PTB, and the above test pattern may also be printed onto the sheet of paper serving as the printing medium.

Although the color registration sensor 60 may exemplarily include an optical sensor composed of a light-emitting element and a light-receiving element, the scope of the color registration sensor 60 is not limited to only this optical sensor, and may also or instead include other examples.

If the image forming apparatus 10 enters the color registration operation, the controller 100 controls the drive unit 110 to drive the drive roller 20 at a predetermined speed. The controller 100 prints a test pattern onto the transfer member 21, or onto another printing medium as described hereinabove, through the image output unit 120. Information about the test pattern is pre-stored in the storage unit 130. In this case, when several test patterns of respective colors are printed onto the transfer member 21 or other printing medium, the controller 100 controls the respective test patterns of the respective colors to be printed at the same rotation phases so as to prevent the influence caused by the speed variation of the drive roller 20. For example, when several black test patterns are sequentially printed and several yellow test patterns are subsequently printed, a first test pattern of yellow is printed according to a rotation phase of the drive roller 20 at a time point when a first test pattern of black is printed, so that the drive roller 20 has the same rotation phase at the above time point. In this way, if an interval between the first test pattern of black and the first test pattern of yellow, each having been printed to have the same rotation phase, is measured by the color registration sensor 60, the interval between respective test patterns of respective colors may be correctly measured with the assumption that the drive roller 20 has the same rotation phase.

The color registration corrector 90 receives a signal from the color registration sensor 60, and transmits a correction value for correcting each color registration error to the controller 100. A detailed description thereof will hereinafter be described with respect to FIGS. 5-7.

Upon receiving the correction value from the color registration corrector 90, the controller 100 stores the received correction value in the storage unit 130. This correction value may be used to form an image by correctly overlapping output color images of the image output unit 120, and may be used to correct each color registration error in a paper-transferring direction and each color registration error in a main-scanning direction along which the image is printed. Accordingly, a color printing operation may be carried out under the condition that each color registration error caused by the variation in speed of the drive roller 20 is excluded or minimized.

Also, when the drive roller 20 driving the transfer member 21 is not circular, the speed of the transfer member 21 is affected, i.e., the speed is non-linear. The controller 100 generates a signal to control the drive source S to compensate for the non-linear speed of the drive roller 20 such that the transfer member 21 can rotate in a predetermined speed in a printing operation of forming images on a sheet through photo-conductors 12-15 and/or the above-described color registration method.

Figure 5:
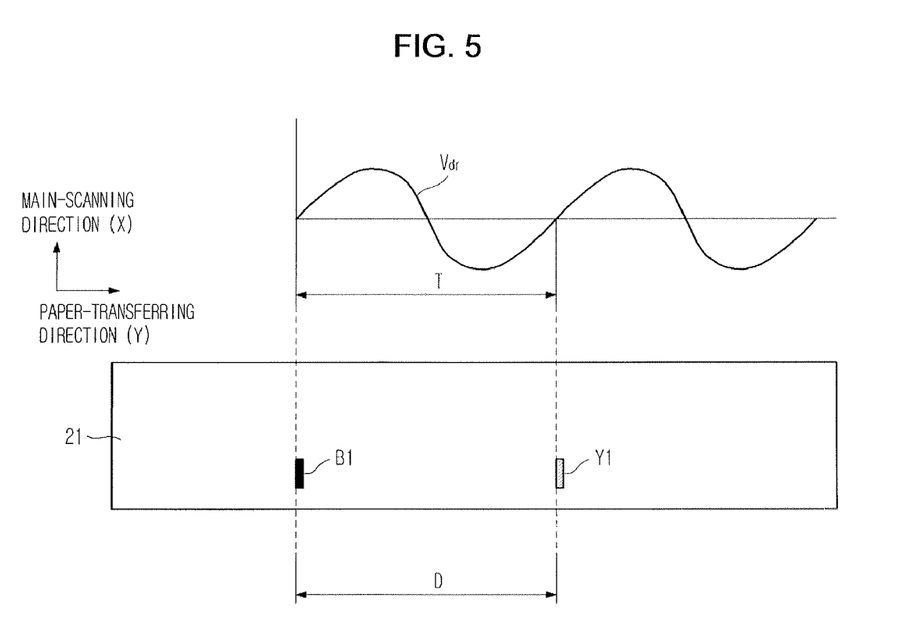
FIG. 5 illustrates a test pattern printed according to a rotation speed of a drive roller according to an exemplary embodiment of the present general inventive concept.

As illustrated in FIG. 5, speed (Vdr) of the drive roller 20 may be periodically changed according to the shape of a cross section of the drive roller 20. The black test pattern (B1) and the yellow test pattern (Y1) printed on the transfer member 21 are spaced apart from each other, and an interval (D) between the patterns B1 and Y1 may correspond to one period (T) of the drive roller 20. If a reference of the color registration is set to the black color, the interval (D) between the black test pattern (B1) and the yellow test pattern (Y1) is compared with a predetermined reference value, such that a color registration error corresponding to a difference between the interval D and the reference value may be corrected. In this way, the color registration error may be calculated under the condition that the speed variation of the drive roller 20 is excluded, such that this calculated result may be selected as a first correction value in the paper-transferring direction (Y).

Since the rotation phase of the drive roller 20 may be periodically changed, an interval between each of the test patterns, belonging to not only any one time point but also one period, and a test pattern of each color may be measured, the measured result is arithmetically averaged, such that the arithmetic mean value may be selected as the above rotation phase. A detailed description thereof will hereinafter be described in detail.

Figure 6:
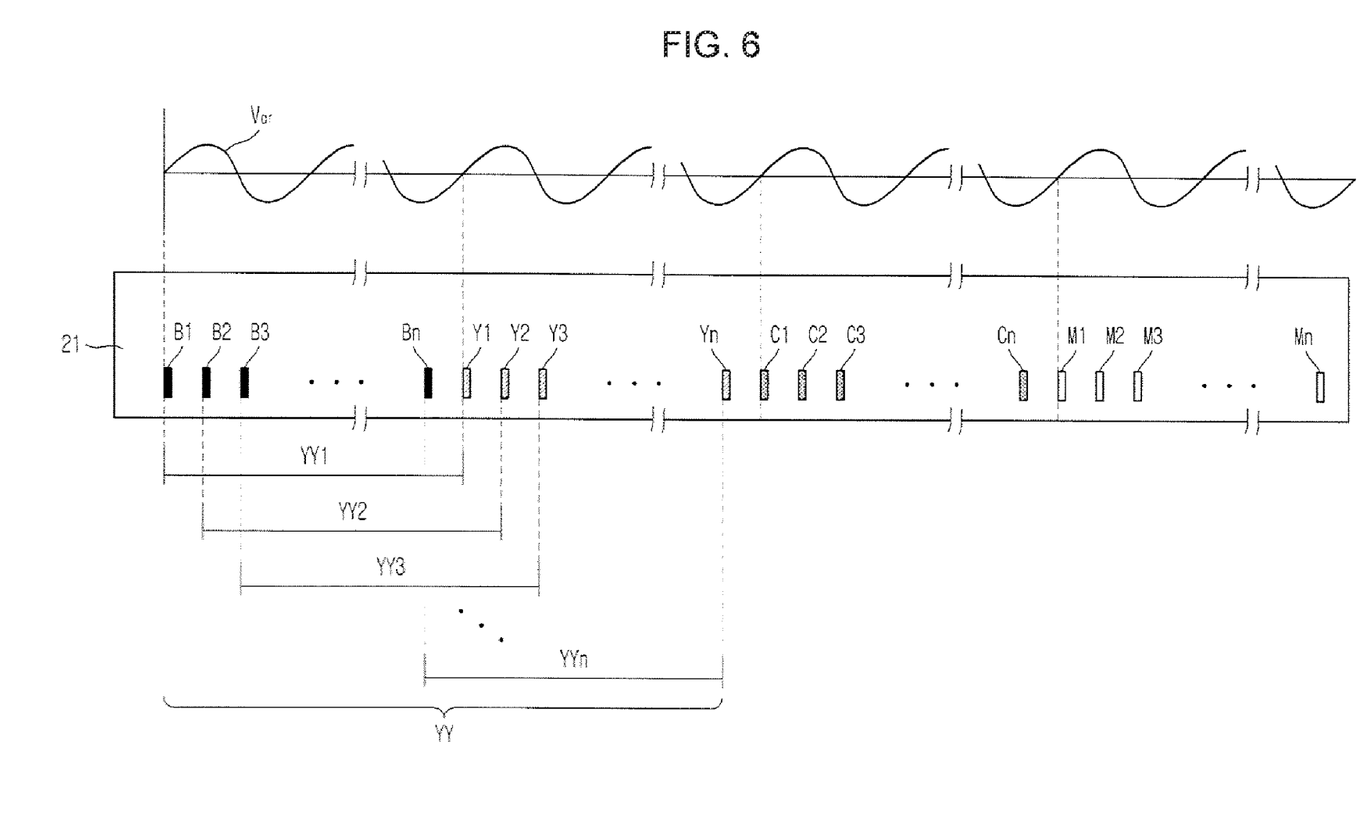
FIG. 6 illustrates operations to calculate a first correction value using a basic-type test pattern printed according to a rotation speed of a drive roller according to an exemplary embodiment of the present general inventive concept.

As shown in FIG. 6, basic-type test patterns for calculating a first correction value of the paper-transferring direction are printed onto the transfer member 21. n basic-type black test patterns (B1, B2, B3, ..., Bn) and n basic-type yellow test patterns (Y1, Y2, Y3, ..., Yn) are respectively printed while being spaced apart from each other by a predetermined distance according to the rotation phase of the same drive roller 20.

Similarly, n basic-type cyan test patterns (C1, C2, C3, ..., Cn) and n basic-type magenta test patterns (M1, M2, M3, ..., Mn) are respectively printed while being spaced apart from each other by a predetermined distance according to the rotation phase of the same drive roller 20.

The color registration corrector 90 receives a signal of the color registration sensor 60, such that it measures distances (YY1, YY2, ..., YYn) between the black test pattern of each color and the yellow test pattern of each color. Also, the color registration corrector 90 arithmetically averages n measurement distances (YY1, YY2, ..., YYn), such that a mean value (YY) of the arithmetically-averaged result is calculated as represented by the following equation 1.

$$YY=(YY1+YY2+\ldots+YYn)/n \quad \text{[Equation 1]}$$

The above mean value (YY) may be selected as a first correction value for correcting a color registration error in a paper-transferring direction between the black color and the yellow color.

The color registration corrector 90 may calculate a first correction value (YC) between the black color and the cyan color and a first correction value (YM) between the black color and the magenta color using the above-mentioned operations.

The color registration corrector 90 transmits first correction values (YY, YC, YM), calculated in the paper-transferring direction (Y) of yellow, magenta, and cyan colors on the basis of the black color, to the controller 100.

The controller 100 stores the first correction values (YY, YC, YM) in the storage unit 130.

Figure 7:
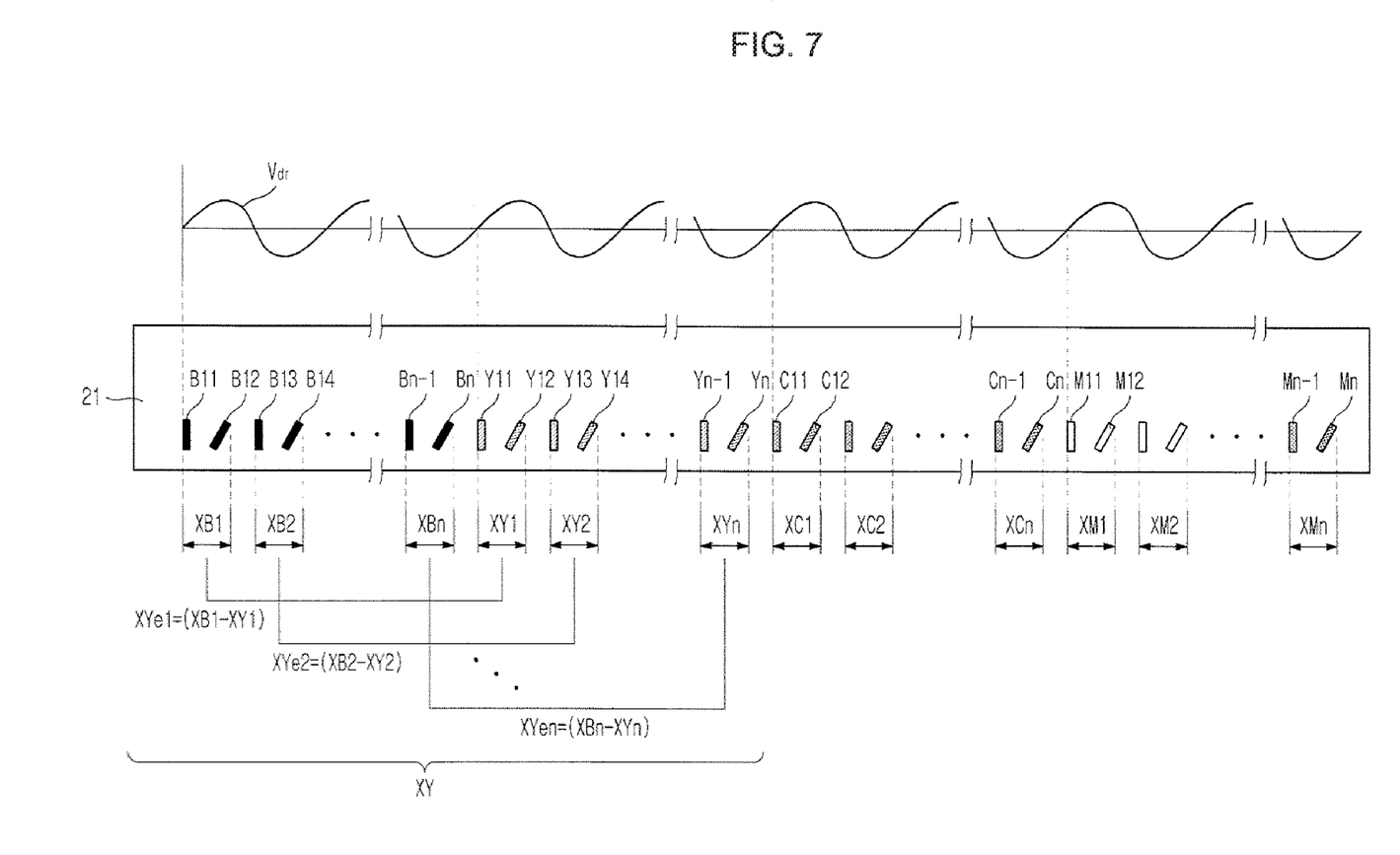
FIG. 7 illustrates operations to calculate a second correction value using a mixed-type test pattern printed according to a rotation speed of a drive roller according to an exemplary embodiment of the present general inventive concept.

Operations for calculating the second correction value to correct the color registration error in the main-scanning direction (X) will hereinafter be described.

Referring to FIG. 7, n mixed-type black test patterns (B11, B12, B13, ..., Bn) and N mixed-type yellow test patterns (Y11, Y12, Y13, ..., Yn) are printed while being spaced apart from each other by a predetermined distance according to the rotation phase of the same drive roller 20.

Similarly, n mixed-type cyan test patterns (C11, C12, C13, ..., Cn) and n mixed-type magenta test patterns (M11, M12, M13, ..., Mn) are respectively printed while being spaced apart from each other by a predetermined distance according to the rotation phase of the same drive roller 20.

The color registration unit 90 receives a signal of the color registration sensor 60, and measures distances (XB1, XB2, ..., XBn) of neighboring black test patterns and distances (XY1, XY2, ..., XYn) of neighboring yellow test patterns using the received signal. The color registration unit 90 calculates each difference (XYe1, XYe2, ..., XYen) between a distance of the black test pattern and a distance of the yellow test pattern. The color registration corrector 90 arithmetically averages n differences (XYe1, XYe2, ..., XYen), such that a mean value (XY) of the arithmetically-averaged result is calculated as represented by the following equation 2.

$$XY=(XYe1+XYe2+\ldots+XYen)/n \quad \text{[Equation 2]}$$

The above mean value (XY) may be selected as a second correction value for correcting a color registration error in a main-scanning direction between the black color and the yellow color.

The color registration corrector 90 may calculate a second correction value (XC) between the black color and the cyan color and a second correction value (XM) between the black color and the magenta color using the above-mentioned operations.

The color registration corrector 90 transmits second correction values (XY, XC, XM), calculated in the main-scanning direction (X) of yellow, magenta, and cyan colors on the basis of the black color, to the controller 100.

The controller 100 stores the second correction values (XY, XC, XM) in the storage unit 130.

The first correction values (YY, YC, YM) and the second correction values (XY, XC, XM) stored in the storage unit 130 may be used when the controller 100 outputs a control signal for correcting the color registration error to the image output unit 120 during the color printing. The image signal generated from the image output unit 120 is provided on the condition that the color registration error is corrected in respective photo-conductors 12, 13, 14, and 15 corresponding to individual colors. Therefore, in case of a real printing operation, color images printed on the printing medium overlap with each other at correct positions, such that the resultant image may be formed.

The color registration method for the image forming apparatus according to an exemplary embodiment will hereinafter be described.

Figure 8:
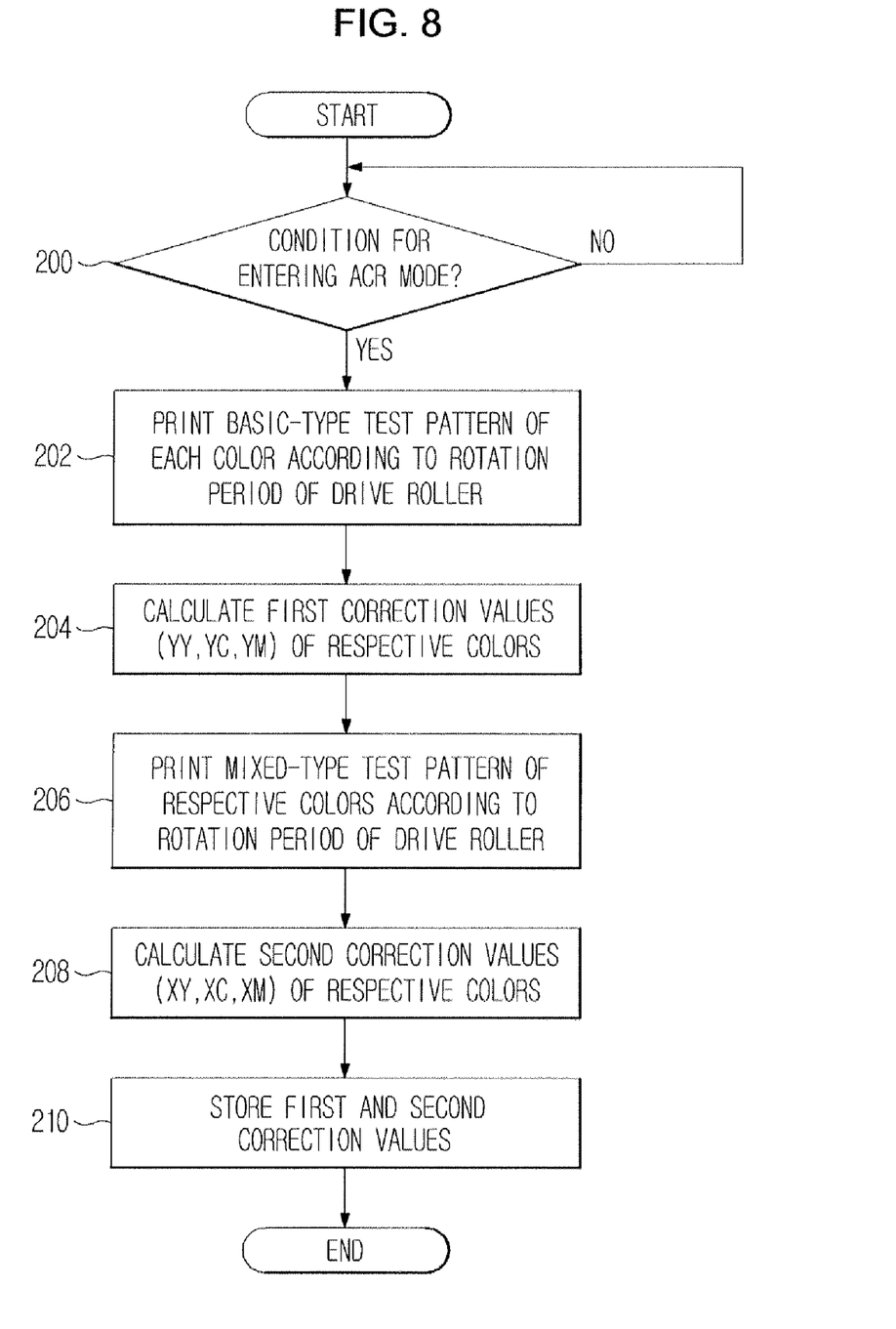
FIG. 8 is a flow chart illustrating a color registration method for an image forming apparatus according to an exemplary embodiment of the present general inventive concept.

As illustrated in FIG. 8, the controller 100 determines whether a current status indicates a condition for entering an auto-color registration (ACR) operation at operation 200.

A variety of situations may be used as a condition for entering the auto-color registration (ACR) operation. For example, if any of the developing machines using toner of one or all of the four colors (yellow, magenta, cyan, and black) is replaced with another, if the cover of the image forming apparatus 10 is opened or closed, or if the total number of printed sheets of paper reaches a predetermined number of sheets of paper, the auto-color registration (ACR) operation may be initiated.

If the condition for entering the auto-color registration (ACR) is reached, the controller 100 drives the drive roller 20 at a certain speed by controlling the drive unit 110. Also, the controller 100 outputs a control signal to the image output unit 120, such that it prints basic-type test patterns for correcting the color registration error in the paper-transferring direction (Y) shown in FIG. 6 onto the transfer member 21 or other printing medium at operation 202.

Information for the basic-type test patterns is received from the storage unit 130. In this case, when several test patterns for respective colors are printed onto the transfer member 21 according to a control signal of the controller 100, the respective test patterns of the respective colors have the same rotation phase as the test patterns with the same order as the reference-color (e.g., black) test patterns.

The color registration sensor 60 detects n basic-type black test patterns (B1, B2, B3, ..., Bn) and n basic-type yellow test patterns (Y1, Y2, Y3, ..., Yn) printed onto the transfer member 21, and provides the color registration corrector 90 with the detected test patterns.

The color registration corrector 90 receives an output signal of the color registration sensor 60, measures distances (YY1, YY2, ..., YYn) between the black test pattern and the yellow test pattern of respective colors having the same order using the received signal, and calculates a mean value (YY)

by arithmetically averaging the measured distances. This mean value (YY) is selected as a first correction value for correcting a color registration error in the paper-transferring direction between the black color and the yellow color. The color registration corrector 90 calculates a first correction value (YC) between the black color and the cyan color and a first correction value (YM) between the black color and the magenta color using the above-mentioned operations at operation 204. The first correction values (YY, YC, YM) calculated by the color registration corrector 90 are transmitted to the controller 100.

Thereafter, the controller 100 drives the drive roller 20 at a certain speed by controlling the drive unit 110. At operation 206, the controller 100 outputs a control signal to the image output unit 120, such that mixed-type test patterns for correcting the color registration error in the main-scanning direction (X) are printed onto the transfer member 21 as shown in FIG. 7.

Information for the mixed-type test pattern is received from the storage unit 130. In this case, when several test patterns of respective colors are printed onto the transfer member 21 according to a control signal of the controller 100, the respective test patterns of the respective colors have the same rotation phase as the test patterns with the same order as the reference-color (e.g., black) test patterns.

The color registration corrector 90 receives an output signal of the color registration sensor 60, measures distances (XB1, XB2, . . . , XBn) of neighboring black test pattern and distances (XY1, XY2, . . . , XYn) of neighboring yellow test patterns, calculates each difference (XYe1, XYe2, . . . , XYen) between the black test pattern's distance and the yellow test pattern's distance, the black test pattern and the yellow test pattern having the same measurement order, and arithmetically averages n differences (XYe1, XYe2, . . . , XYen) to calculate a mean value (XY).

The above mean value (XY) may be selected as a second correction value for correcting a color registration error in a main-scanning direction between the black color and the yellow color. At operation 208, the color registration corrector 90 may calculate a second correction value (XC) between the black color and the cyan color and a second correction value (XM) between the black color and the magenta color using the above-mentioned operations. The second correction values (XY, XC, XM) calculated by the color registration corrector 90 are provided to the controller 100.

At operation 210, the controller 100 stores the first correction values (YY, YC, YM) and the second correction values (XY, XC, XM) provided from the color registration corrector 90 in the storage unit 130. In this case, the first correction values (YY, YC, YM) and the second correction values (XY, XC, XM) may be used when the controller 100 outputs the control signal for correcting the color registration error to the image output unit 120 during regular color printing. Accordingly, the image signal generated from the image output unit 120 is provided when the color registration error is corrected in respective photo-conductors 12, 13, 14, and 15 corresponding to individual colors. Therefore, in case of a real printing operation, color images printed onto the printing medium overlap with one another at correct positions, such that the resultant image may be formed.

As is apparent from the above description, the image forming apparatus or the auto-color registration method thereof corrects each color registration error by excluding or minimizing the influence caused by variation in speed of the drive unit, such that it increases a reliability of an auto color registration operation and thus an image quality of an image output from the image forming apparatus is also increased.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An image forming apparatus comprising:
a transfer member;
a drive unit to drive the transfer member;
a sensor to detect test patterns;
a color registration correction unit to calculate a correction value by measuring a distance between a test pattern of a reference color and another test pattern of a correction-target color, where the reference color's test pattern and the correction-target color's test pattern are detected by the sensor; and
a controller to print a test pattern of the reference color and the test pattern of the correction-target color according to a same rotation phase with respect to the drive unit, and control an operation for outputting an image in which a color registration error is corrected on the basis of a correction value calculated by the color registration correction unit.

2. The apparatus according to claim 1, wherein the test pattern of each color is printed on the transfer member.

3. The apparatus according to claim 1, wherein the color registration correction unit averages measurement values of a plurality of test patterns of each color belonging to one rotation period of the drive unit.

4. The apparatus according to claim 3, wherein the color registration correction unit calculates a first correction value to correct a color registration error in a paper-transferring direction, and a second correction value to correct a color registration error in a main-scanning direction.

5. The apparatus according to claim 4, further comprising:
a storage unit to store the first correction value, the second correction value, and information of the test patterns of each color.

6. A color registration method for an image forming apparatus comprising:
printing test patterns of respective colors according to a rotation period of a drive unit driving a transfer member;
measuring a distance between a test pattern of a reference color and another test pattern of a correction-target color among the test patterns of the respective colors; and
calculating a correction value to correct a color registration error on the basis of the measured distance.

7. The method according to claim 6, further comprising:
printing the test pattern of the reference color and the test pattern of the correction-target color according to the same rotation phase with respect to the drive unit.

8. The method according to claim 6, wherein the calculating of the correction value includes averaging measurement values of a plurality of test patterns of respective colors belonging to one rotation period of the drive unit.

9. The method according to claim 6, wherein the calculating of the correction value includes calculating a first correction value to correct each color registration error in a paper-transferring direction based on a basic-type test pattern, and calculating a second correction value to correct each color registration error in a main-scanning direction based on a mixed-type test pattern.

10. The method according to claim 6, wherein the test pattern of each color is printed on a printing medium.

11. An image forming apparatus comprising:
a plurality of photo-conductors to print a test color print;
a transfer medium;
a drive roller to direct the transfer medium across the plurality of photo-conductors, the drive roller having a non-circular shape and a regular period of rotation;
a color registration unit to receive test color print information from the transfer medium; and
a controller in communication with the plurality of photo-conductors to print the test color print onto the transfer medium at an interval related to the rotational period of the transfer roller and in communication with the color registration unit to receive the test color print information, the controller correcting a color registration error on the basis of the test color print.

12. The apparatus according to claim 11, wherein the plurality of photo-conductors print the colors yellow, cyan, magenta, and black.

13. The apparatus according to claim 11, wherein the controller calculates a first correction value to correct a color registration error in a paper-transferring direction, and a second correction value to correct a color registration error in a main-scanning direction.

14. The apparatus according to claim 13, further comprising:
a storage unit to store the first correction value, the second correction value, and information of the test color prints of each color.

15. An image forming apparatus comprising:
a transfer member to transfer an image to a print medium;
a drive roller to drive the transfer member, the drive roller being a non-circular shape causing a non-linear speed of the transfer member; and
a controller to generate a signal to control the drive roller to compensate for the non-linear speed of the transfer member.

16. The apparatus according to claim 15, further comprising:
a drive source to drive the drive roller, wherein the controller outputs the signal to the drive source.

17. The apparatus according to claim 15, wherein the controller detects the non-circular shape of the drive roller to output the signal.

18. The apparatus according to claim 15, wherein the controller detects the non-linear speed of the drive roller to output the signal.

19. The apparatus according to claim 15, wherein the controller detects a pattern formed on the print media using the drive roller and the transfer member to determine at least one of the non-circular shape of the drive roller and the non-linear speed of the transfer member to generate the signal.

* * * * *